(12) United States Patent
Lutian

(10) Patent No.: US 7,227,531 B2
(45) Date of Patent: Jun. 5, 2007

(54) DATA INPUT DEVICE FOR TRACKING AND DETECTING LIFT-OFF FROM A TRACKING SURFACE BY A REFLECTED LASER SPECKLE PATTERN

(75) Inventor: John Michael Lutian, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 662 days.

(21) Appl. No.: 10/641,672

(22) Filed: Aug. 15, 2003

(65) Prior Publication Data

US 2005/0035947 A1    Feb. 17, 2005

(51) Int. Cl.
G09G 5/08 (2006.01)
(52) U.S. Cl. ............................ 345/163; 345/166
(58) Field of Classification Search ............... 345/156, 345/157, 163, 166, 179; 250/221; 356/28, 356/496; 382/312, 313, 321
See application file for complete search history.

(56) References Cited

U.S. PATENT DOCUMENTS

| | | | |
|---|---|---|---|
| 4,364,035 A | 12/1982 | Kirsch | |
| 4,719,455 A | 1/1988 | Louis | |
| 4,794,384 A | 12/1988 | Jackson | |
| 5,107,541 A | 4/1992 | Hilton | |
| 5,274,361 A | 12/1993 | Snow | |
| 5,574,480 A | 11/1996 | Pranger et al. | |
| 5,644,139 A | 7/1997 | Allen et al. | |
| 5,729,009 A | 3/1998 | Dändliker et al. | |
| 5,793,357 A | 8/1998 | Ivey et al. | |
| 5,852,434 A | 12/1998 | Sekendur | |
| 5,907,152 A | 5/1999 | Dändliker et al. | |
| 6,031,218 A | 2/2000 | Piot et al. | |
| 6,057,540 A | 5/2000 | Gordon et al. | |
| 6,124,587 A | 9/2000 | Bidiville et al. | |
| 6,151,015 A | 11/2000 | Badyal et al. | |

(Continued)

FOREIGN PATENT DOCUMENTS

GB    2272763 A    5/1994

(Continued)

OTHER PUBLICATIONS

Schnell et al., "Detection of Movement with Laser Speckle Patterns: Statistical Properties," Optical Society of American, Jan. 1998, pp. 207-216, vol. 15, No. 1.

(Continued)

*Primary Examiner*—Regina Liang
(74) *Attorney, Agent, or Firm*—Senniger Powers

(57) ABSTRACT

A data input device for use with an optically rough tracking surface comprising a coherent light source projecting a coherent light beam and an optic positioned in the coherent light beam. The optic alters a wavefront profile of the coherent light beam so that the coherent light beam has a substantially constant phase relative to a plane perpendicular to the beam at a tracking distance from the optic. The coherent light beam is projected onto the tracking surface to reflect a substantially stable speckle pattern. A controller responsive to a detector correlates the substantially stable speckle pattern to track relative movement between the coherent light beam and the tracking surface. The controller suspends tracking of relative movement between the coherent light beam and the tracking surface when the detector detects a boiling speckle pattern.

51 Claims, 7 Drawing Sheets

U.S. PATENT DOCUMENTS

| | | |
|---|---|---|
| 6,172,354 B1 | 1/2001 | Adan et al. |
| 6,246,482 B1 | 6/2001 | Kinrot et al. |
| 6,249,591 B1 * | 6/2001 | Tullis |
| 6,256,016 B1 | 7/2001 | Piot et al. |
| 6,281,882 B1 | 8/2001 | Gordon et al. |
| 6,310,988 B1 | 10/2001 | Flores et al. |
| 6,330,057 B1 | 12/2001 | Lederer et al. |
| 6,424,407 B1 | 7/2002 | Kinrot et al. |
| 6,433,780 B1 | 8/2002 | Gordon et al. |
| 6,448,977 B1 | 9/2002 | Braun et al. |
| 6,452,683 B1 | 9/2002 | Kinrot et al. |
| 6,454,482 B1 | 9/2002 | Silverbrook et al. |
| 6,455,840 B1 | 9/2002 | Oliver et al. |
| 6,474,888 B1 | 11/2002 | Lapstun et al. |
| 6,498,604 B1 | 12/2002 | Jensen |
| 6,529,184 B1 | 3/2003 | Julienne |
| 6,531,692 B1 | 3/2003 | Adan et al. |
| 6,642,506 B1 * | 11/2003 | Nahum et al. ............... 250/221 |
| 6,707,027 B2 * | 3/2004 | Liess et al. ................. 250/221 |
| 2002/0145588 A1 | 10/2002 | McCahon et al. |
| 2003/0103037 A1 | 6/2003 | Rotzoll |
| 2004/0061680 A1 | 4/2004 | Taboada |
| 2004/0118919 A1 * | 6/2004 | Breytman et al. |
| 2004/0156098 A1 * | 8/2004 | Dubois et al. |
| 2004/0234107 A1 * | 11/2004 | Machida et al. |
| 2005/0057492 A1 * | 3/2005 | Bathiche et al. ............ 345/156 |

FOREIGN PATENT DOCUMENTS

WO    WO 97/43807 A1    11/1997

OTHER PUBLICATIONS

Asakura et al., "Dynamic Laser Speckles and Their Application to Velocity Measurements of the Diffuse Object," Applied Physics, 1981, 179-194.

Ohtsubo et al., "Velocity Measurement of a Diffuse Object by Using Time-Varying Speckles," Optical and Quantum Electronics, 1976, pp. 523-529, Chapman and Hall Ltd., Great Britain.

* cited by examiner

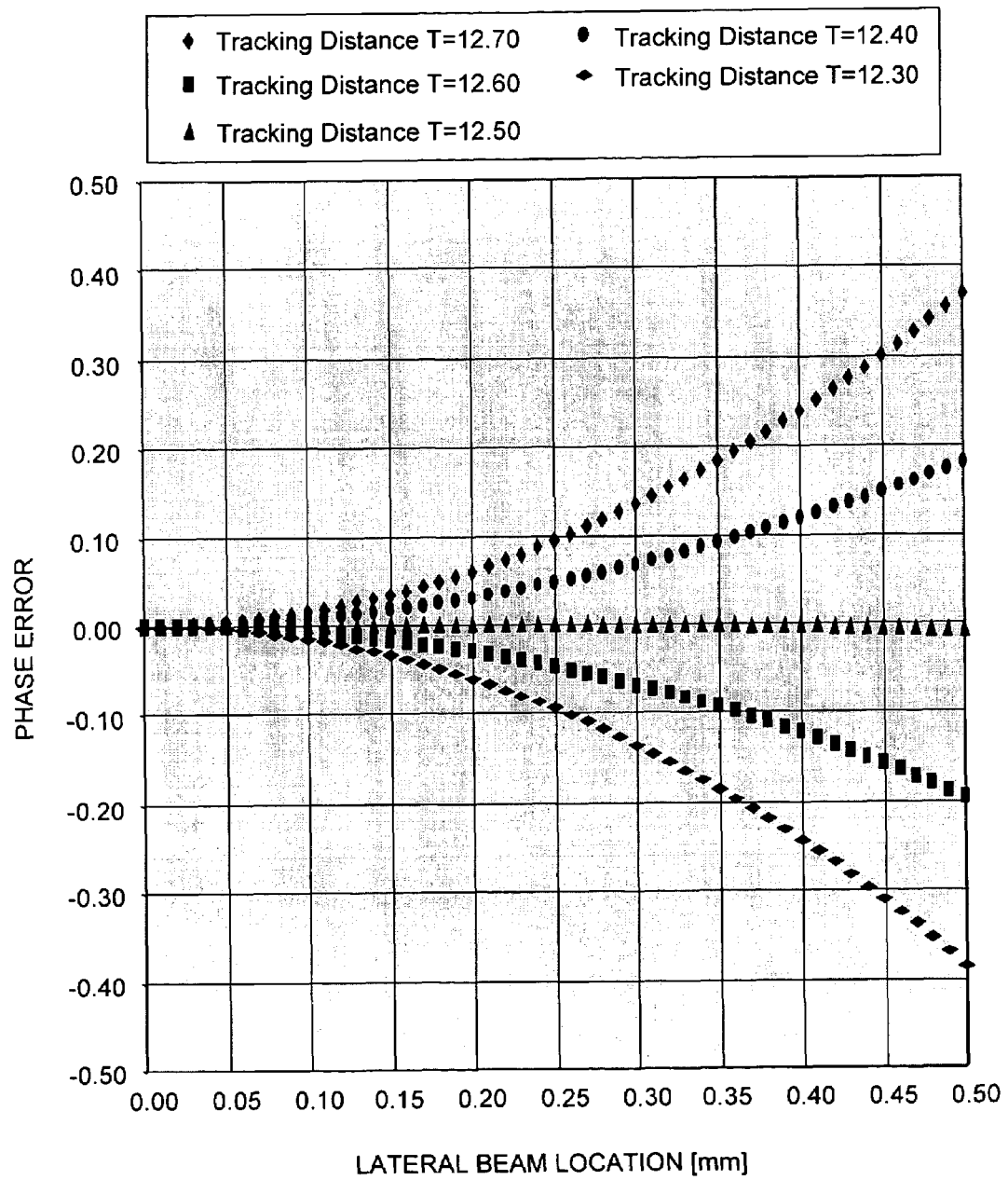

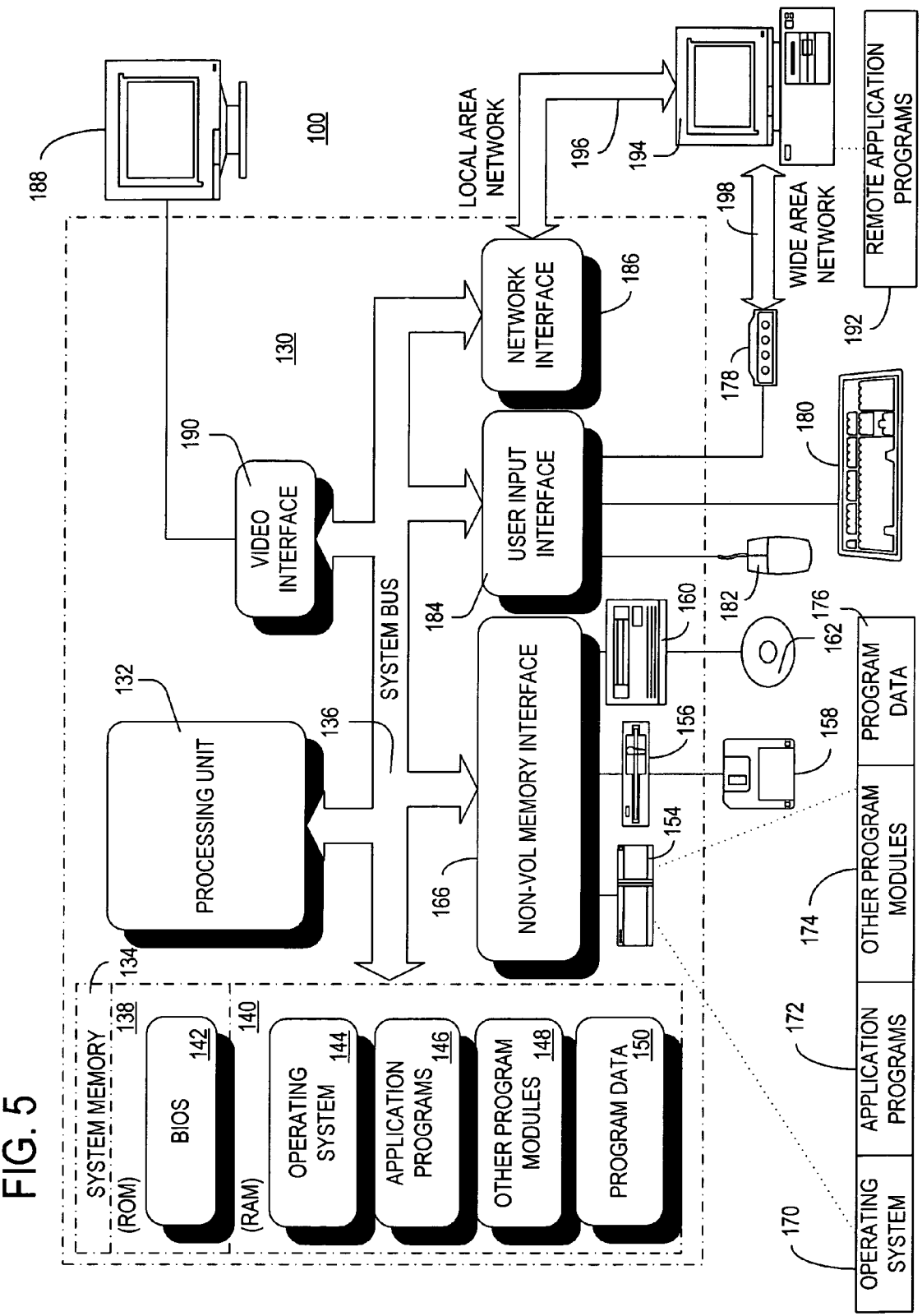

DATA INPUT DEVICE FOR TRACKING AND DETECTING LIFT-OFF FROM A TRACKING SURFACE BY A REFLECTED LASER SPECKLE PATTERN

TECHNICAL FIELD

Embodiments of the present invention relate to the field of computer input devices, and particularly data input devices, such as a mouse or optical pen, employing coherent light striking a tracking surface. In particular, embodiments of this invention relate to data input devices for projecting a coherent light beam onto the tracking surface and altering a wavefront profile of the coherent light beam so that the coherent light beam has a substantially constant phase relative to a plane perpendicular to the beam at a tracking distance from the optic for reflecting a substantially stable speckle pattern from the altered coherent light beam.

INCORPORATION BY REFERENCE

The following U.S. patent is hereby fully incorporated by reference: U.S. Pat. No. 6,531,692 B 1 issued to Adan et al., entitled "OPTICAL COUPLING ASSEMBLY FOR IMAGE SENSING OPERATOR INPUT DEVICE", and assigned to Microsoft Corporation.

BACKGROUND OF THE INVENTION

Previous computer input devices, such as mice, include rotatable balls mounted within a housing, yet rotatably engaging a surface. As the housing of such a mouse translates across the surface, the ball rotates within the housing, engaging horizontal and vertical wheels that rotate against the ball, thereby indicating horizontal and vertical movement of the mouse across the surface. When the device is lifted from the surface, hereinafter referred to as lift-off, the ball stops rotating and the horizontal and vertical movement information provided by the wheels stops. Horizontal and vertical wheel rotation translates into an on-screen visual image of a cursor that responds to movement of the device. Because such devices have a moving ball that must pass through a hole in the housing, such devices often become contaminated with dust and dirt, which may yield inaccurate or intermittent cursor tracking. Moreover, the tracking surface and ball must have sufficient friction between the two to cause the ball to rotate when the housing translates over the surface. To help provide such friction and minimize contamination of the device, specialized tracking surfaces (e.g., mouse pads) are typically used. Thus, a major limitation of such a device is that it requires a tracking surface with particular characteristics, such as adequate friction and cleanliness, which are not readily found on all surfaces.

Building upon these primarily mechanical tracking devices, optical tracking devices have become available. Such devices optically track movement of a surface, rather than mechanically as with the devices described immediately above. These systems may avoid some of the drawbacks associated with the devices described above. In particular, these devices typically do not require wheels in contact with a movable ball, which acts as a common collection point for dust and dirt. Instead, the ball is typically covered with a distinct pattern. As the ball rotates over a surface, photodetectors facing another side of the ball collect information about the movement of the distinct pattern of the ball as the ball rotates. A tracking engine then collects this information, determines which way the pattern is translating and translates a cursor similarly, as described above. These devices offer improvements over previous designs by eliminating moving parts (the wheels) and changing the ball detection interaction from mechanical to optical. However, such devices lack the ability to track on any surface, requiring a suitable frictional interface between the ball and the surface. Moreover, these devices still require one moving part, the ball. In addition, aliasing artifacts may cause the cursor to skip, rather than move fluidly.

Still other optical devices place the pattern on the tracking surface (e.g., a mouse pad), rather than on the rotatable ball, thereby using the mouse pad to generate optical tracking information. Although such devices are able to eliminate the moving ball, they are less universal by requiring a specific tracking surface to operate.

Other more recent optical tracking devices have emerged that have eliminated the need for a patterned ball or mouse pad. One such device utilizes an LED to project light across the tracking surface at a grazing angle to the tracking surface. The mouse then collects tracking information by two methods. First, by tracking changes in color on the tracking surface by any pattern that may appear on the tracking surface, or second, by detecting dark shadows cast by high points in the surface texture, which appear as dark spots. This device eliminates the moving ball of previous devices, and is useful on a variety of surfaces. However, smooth surfaces with little color variation may prove difficult to track upon. Smooth surfaces generate no shadows from texture and present a low contrast image that may not provide adequate features upon which to track. Surfaces with very little color variation also present a low contrast image that may not provide adequate features upon which to track. For example, such a mouse could not track upon opal glass, which is a material consisting of very small crystals imbedded in a clear glass matrix. Opal glass has an opaque white surface and is very smooth.

However, these systems lack the ability to both track movement of a tracking surface over substantially any surface and detect when the device has been removed from the tracking surface for freezing the cursor.

SUMMARY OF THE INVENTION

Accordingly, a data input device for use with a tracking surface, the device comprising a coherent light source for projecting a coherent light beam onto the tracking surface and an optic for altering a wavefront profile of the coherent light beam to exhibit a substantially constant phase relative to a plane perpendicular to the beam for reflecting a substantially stable speckle pattern from the altered coherent light beam is desired to address one or more of these and other disadvantages.

The data input device of the present invention is for use with an optically rough tracking surface to track relative movement between the device and the tracking surface. The device includes a controller, a coherent light source and a detector. The coherent light source projects a coherent light beam and an optic positioned in the coherent light beam alters the wavefront profile of the coherent light beam so that the coherent light beam has a substantially constant phase relative to a plane perpendicular to the beam at a tracking distance from the optic. The coherent light beam is projected onto the tracking surface to reflect a substantially stable speckle pattern. The controller is responsive to the detector to correlate the substantially stable speckle pattern to track relative movement between the coherent light beam and the tracking surface. The controller suspends tracking of relative movement between the coherent light beam and the tracking surface when the detector detects a boiling speckle pattern.

The device allows for both tracking and suspension of tracking of the data input device when appropriate. Moreover, the arrangement of the optic and tracking surface provides a substantially stable speckle pattern for tracking. Lift-off detection, or suspension of tracking, occurs without additional sensors, utilizing the image data detected by the detector.

In accordance with one aspect of the invention, a data input device is disclosed for use with an optically rough tracking surface. The device comprises a coherent light source for projecting a coherent light beam onto the tracking surface to reflect a speckle pattern from the coherent light beam striking the tracking surface. The device further comprises an optic positioned in the coherent light beam for altering a wavefront profile of the coherent light beam so that the coherent light beam has a substantially constant phase relative to a plane perpendicular to the beam at a tracking distance from the optic. The tracking distance is different than a focal length of the optic, whereby the tracking surface reflects a substantially stable speckle pattern from the altered coherent light beam when the coherent light source and tracking surface are separated by about the tracking distance.

In another aspect of the invention, a data input device is disclosed for use with an optically rough tracking surface. The device comprises a coherent light source and coherent light beam generally as set forth above. An optic positioned in the coherent light beam alters a wavefront profile of the coherent light beam to create a detection zone between about 35% and about 90% of the focal length of the optic and a lift-off zone beyond about 90% of the focal length of the optic. Relative movement within the detection zone between the coherent light beam and the tracking surface is detected based on the reflected speckle pattern. Relative movement within the lift-off zone between the coherent light beam and the tracking surface is not detected.

In yet another aspect of the invention, a data input device for suspending tracking of movement comprises a source projecting a coherent light beam from a tracking device onto an optically rough tracking surface. An optic focuses the coherent light beam, and a detector detects out-of-phase coherent light reflected from the tracking surface as a speckle pattern. A controller determines if the tracking data input device is spatially separated from the tracking surface by at least a lift-off detection distance as a function of the detected speckle pattern. The controller suspends tracking of relative movement between the tracking data input device and the tracking surface when the tracking data input device is spatially separated from the tracking surface by at least the lift-off detection distance.

In still another aspect of the invention, a method comprises projecting a coherent light beam from a data input device onto an optically rough tracking surface. The method further focuses the coherent light beam and detects out-of-phase coherent light reflected from the tracking surface as a speckle pattern. The method determines if the data input device is spatially separated from the tracking surface by at least a lift-off detection distance as a function of the detected speckle pattern. The method further suspends tracking of relative movement between the data input device and the tracking surface when the data input device is spatially separated from the tracking surface by at least the lift-off detection distance.

Alternatively, the invention may comprise various other methods and apparatuses.

Other features will be in part apparent and in part pointed out hereinafter.

BRIEF DESCRIPTION OF THE DRAWINGS

FIG. 4 is a graph depicting phase errors of coherent light for an optic placed at varying locations within a coherent light beam path; and FIG. 5 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
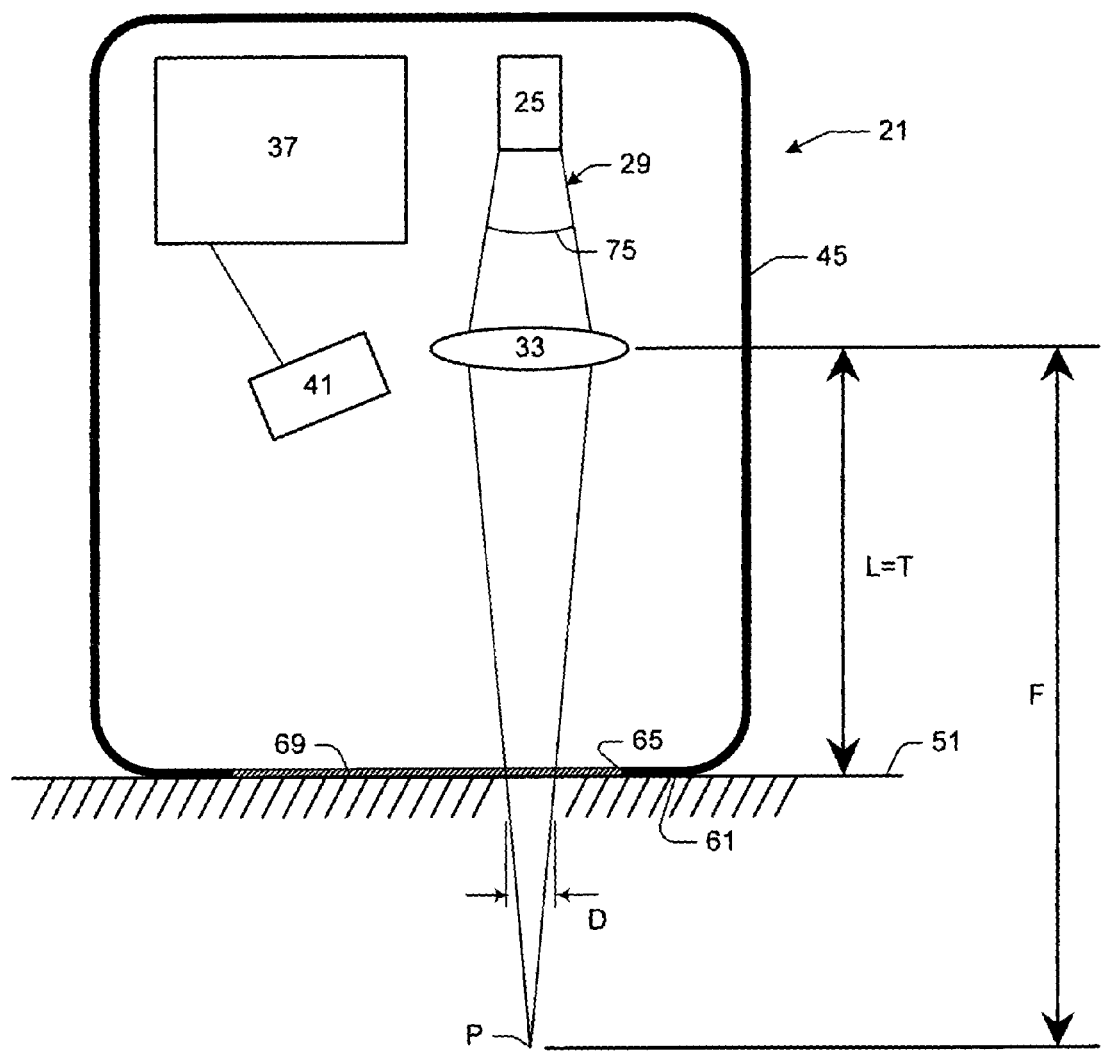
FIG. 1 is a schematic of a data input device of the present invention contacting a tracking surface.
Figure 2:
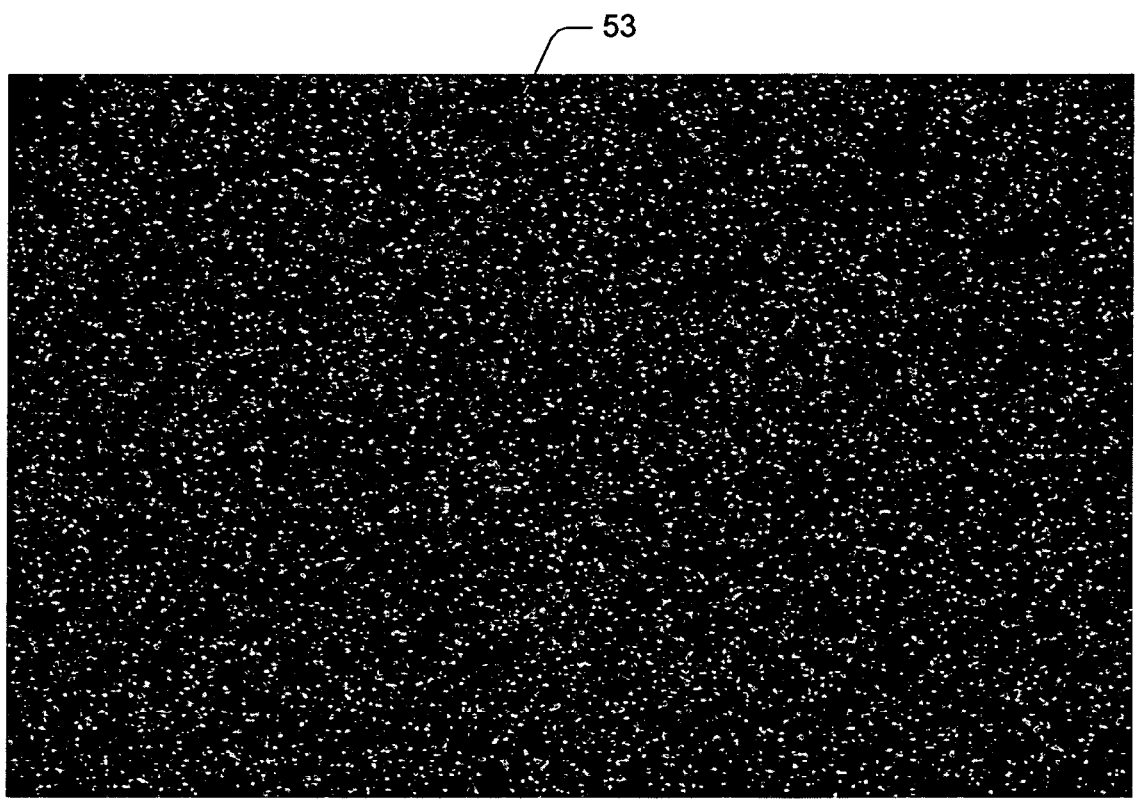
FIG. 2 is an image of a speckle pattern.

In one embodiment, the invention includes a data input device for use with a tracking surface that is optically rough, or in other words, has light-scattering properties. FIG. 1 is a schematic of a data input device of the present invention. The data input device, generally indicated 21, includes a coherent light source 25 (e.g., a laser) for projecting a coherent light beam, generally indicated 29. An optic 33, a controller 37, or tracking engine, and a detector 41 are each enclosed in a housing 45 of the device 21. The data input device 21 is used with a tracking surface 51 to track relative movement between the device and the tracking surface. The tracking surface 51 is optically rough, so that coherent light reflected from the tracking surface produces a speckle pattern 53 (e.g., FIG. 2). For example, paper, wood, metal, fabric, plastic and human skin each generally have sufficient surface variation to reflect a speckle pattern 53. Only surfaces that are perfectly reflective, such as a ground and polished, optic-quality, flat, transparent glass, are insufficiently rough to reflect a speckle pattern 53. Therefore, when the coherent light source 25 projects a coherent light beam 29 (e.g., a laser beam) onto the tracking surface 51, the light-scattering properties of the tracking surface are sufficient to reflect a speckle pattern 53. Speckle patterns created when coherent light strikes diffuse surfaces are well known in the art, and their origin and theory will not be reviewed in detail here.

The speckle pattern 53 is useful for tracking because as the coherent light beam 29 and tracking surface 51 move relative to one another, the spatial relationships of the speckle grains in the speckle pattern are maintained as the speckle image translates across the detector 41, enabling a strong correlation to a reference image, or previous speckle image, in the tracking engine 37. The stable speckle pattern 53 allows the tracking engine 37 to follow its path across the detector 41, thereby indicating relative movement between the device 21 and the tracking surface 51. Transient speckle grains are not suitable for tracking because they may disappear and reappear as the device 21 and tracking surface 51 move relative to one another, reducing the correlation strength relative to the reference image of the tracking engine 37. A substantially stable speckle pattern 53 is characterized by a substantial portion of stable speckle grains upon which relative movement of the device 21 and the tracking surface 51 may be tracked. Correlation and phase-based tracking engines 37 depend upon a sequence of stable images to correctly identify tracking motion. Degradation or distortion of tracking input images relative to a reference image severely impairs accurate functioning of correlation and phase-based tracking engines 37. A substantially stable speckle pattern improves functioning of tracking engines 37 because it provides a reliable image by which relative movement of the device 21 may be tracked. On the other hand, a speckle pattern 53 exhibiting speckle grains that are not substantially stable is characterized as boiling, and is typically caused because the coherent light beam 29 strikes the tracking surface 51 substantially out-of-phase. Techniques for minimizing speckle pattern 53 boiling will be discussed in greater detail below.

In any event, tracking relative movement between the device 21 and the tracking surface 51 using the reflected speckle pattern 53, rather than a pattern fixed on a surface, offers several advantages. First, virtually any surface may be used as a tracking surface 51. Second, particular coherent light sources 25, such as lasers, draw very little power and may be used in battery-operated devices that must operate efficiently. Third, utilizing a reflected speckle pattern 53 as the tracking indicia eliminates the need for a patterned surface, such as a ball or a mouse pad, as was practiced in the prior art.

One such suitable laser 25 (coherent light source) is a vertical cavity surface emitting laser (VCSEL). Although any type of laser may be used, a VCSEL has the distinct advantage drawing less than about 1.0 mW (1.3 μhorsepower) of power. In addition, VCSELs are relatively small in size, easing packaging considerations, and are relatively inexpensive to manufacture, easing cost considerations. Other lasers and sources of coherent light may also be utilized without departing from the scope of the claimed invention.

The detector 41 of the device 21 detects the speckle pattern 53 reflected by the tracking surface 51 and images the detected speckle pattern. Any detector 41 capable of imaging the reflected speckle pattern 53 may be utilized with the present embodiment. Such detectors 41 may include photodetectors, CCDs (charge-coupled devices), CMOS (complementary metal-oxide semiconductor) technology or other detector arrays. The detector 41 detects the dark and light pattern generated by the reflected speckle pattern 53 and sends information corresponding to this detected speckle grain to the controller 37, which is responsive to the detector. The controller 37 then correlates the speckle pattern 53 to track the relative movement between the device 21 and the tracking surface 51. Tracking engines 37 utilizing pattern detection to correlate a moving pattern as well as other correlation methods are well known in the art and will not be described in detail here. More importantly, tracking relative movement between the device 21 and the tracking surface 51 by detecting movement of the speckle pattern 53 is only feasible when the speckle pattern is substantially stable. A substantially stable speckle pattern 53 will produce speckle grains that are stationary with respect to the tracking surface 51, acting as tracking indicia on what may be an unmarked tracking surface. With substantially stable speckle grains, the detector 41 and controller 37 can work together to track the movement of such grains, thereby tracking relative movement between the device 21 and any optically rough tracking surface 51. One skilled in the art would readily understand how to utilize a detector 41 and a correlation tracking engine 37 to correlate the movement of a substantially stable pattern, here the substantially stable speckle grains, across the detector with relative movement between the device 21 and the tracking surface 51.

Figure 1A:
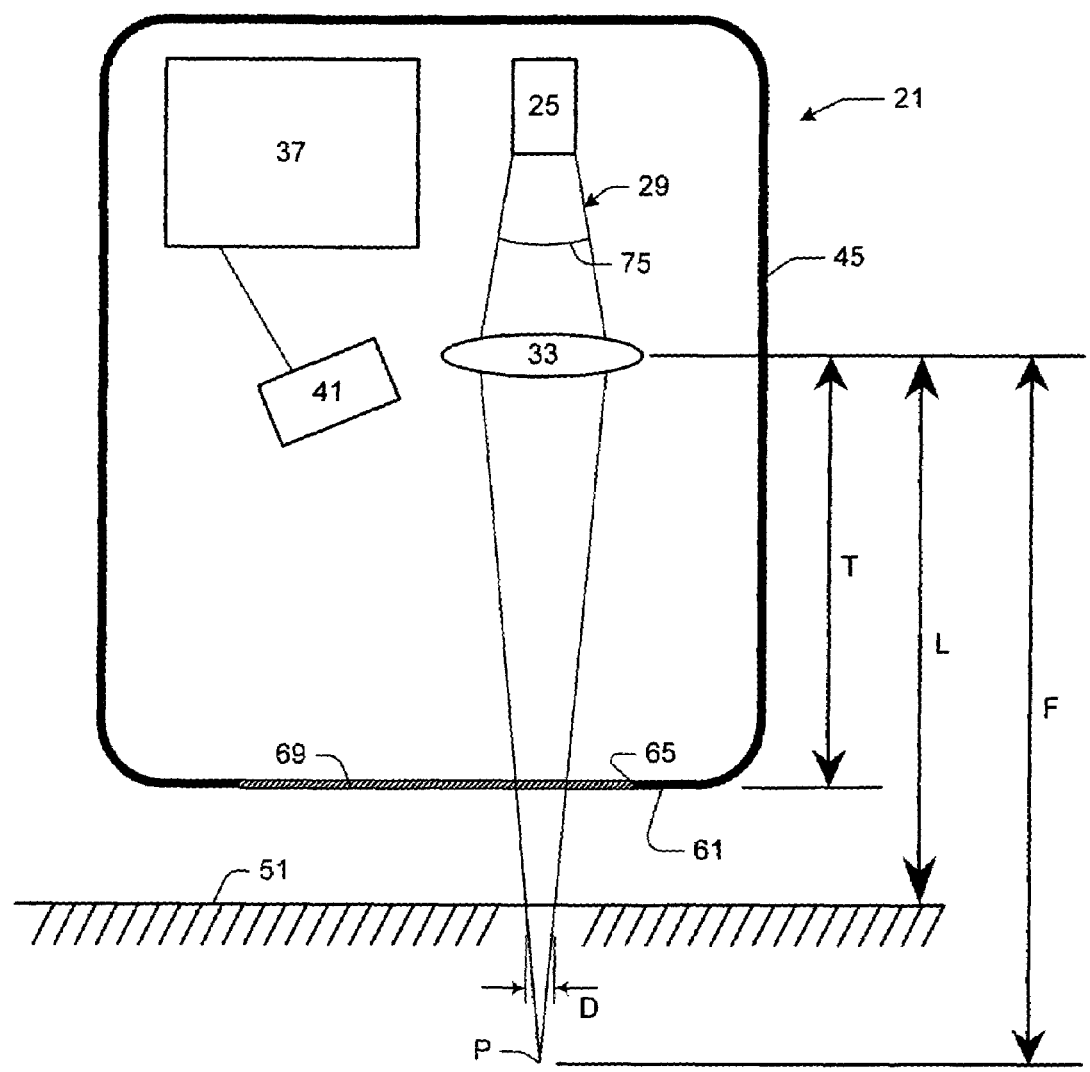
FIG. 1A is a schematic of the data input device of FIG. 1 in a lift-off position relative to the tracking surface.

The housing 45 of the device 21 surrounds the optic 33, detector 41 and controller 37, and may take any shape, such as shown in the schematics of FIGS. 1 and 1A or as a typical computer mouse. The housing 45 includes a support surface 61 sized and shaped for contacting the tracking surface 51. The support surface 61 shown is substantially continuous, thereby providing a large contact area with the tracking surface 51. In addition, the support surface 61 shown is substantially planar to help maintain flatwise contact with the tracking surface 51. The support surface 61 also includes an opening 65 for allowing the coherent light beam 29 to exit the housing 45 and the speckle pattern 53 reflected by the tracking surface 51 to reenter the housing and strike the detector 41. The opening 65 is covered with a transparent window 69, thereby sealing the housing 45 from dust and dirt. The window 69 can either be a portion of the housing 45 formed from a transparent material or an additional piece mounted on the housing. The opening 65 may also remain open, without the window 69, without departing from the scope of the present invention. The support surface 61 may alternately be formed in a non-planar or non-continuous configuration, without departing from the scope of the present invention. For example, the support surface 61 may be formed with a mere three contacts points, which position and orient the device 21 with respect to the tracking surface 51, while the remaining portions of the support surface do not contact the tracking surface.

Figure 1B:
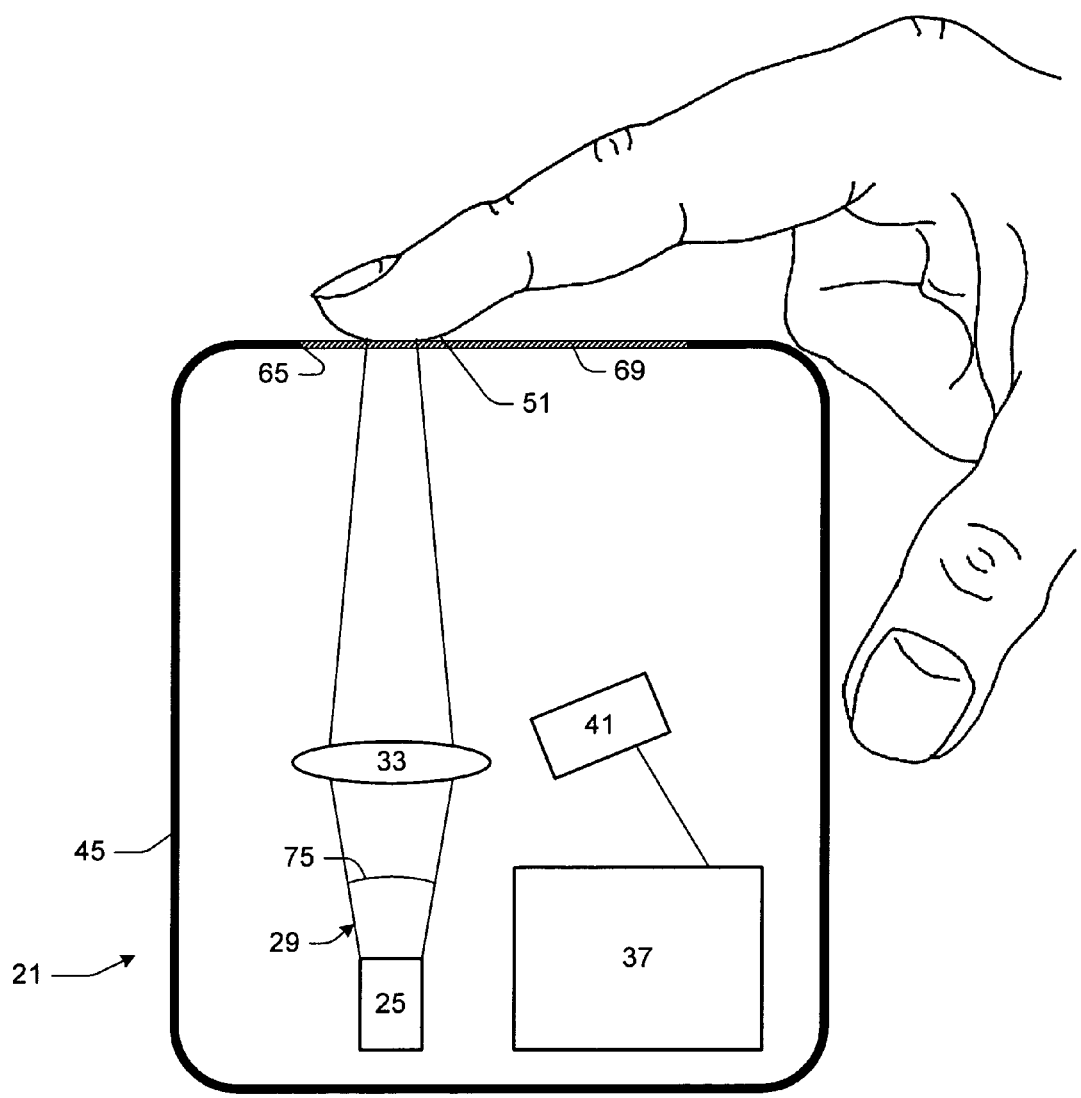
FIG. 1B is a schematic of a data input device of the present invention contacting human skin.

Referring again to FIGS. 1 and 1A, the device 21 is depicted in alternate positions: a tracking position contacting the tracking surface 51 and a lift-off position remote from the tracking surface, respectively. A tracking distance T of the device 21 is defined as about the distance between the optic 33 and the support surface 61, or about the distance from the tracking surface 51 to the optic when the device is contacting, or nearly contacting, the tracking surface (e.g., FIG. 1). The tracking distance T of the device is selected in conjunction with the optic 33 to encourage a substantially stable speckle pattern 53, as discussed in detail below. A distance L is defined as the distance from the optic 33 to the image plane, which for this device 21 comprises the tracking surface 51. In FIG. 1, where the device 21 contacts the tracking surface 51, the tracking distance T and distance to the image plane L are the same. In FIG. 1A, however, where the device 21 is in a lift-off position, the tracking distance T and distance to the image plane L are different. It should be noted here that the terms "lift-off" or "lifting" the device 21 additionally comprise lifting, or moving, the tracking surface 51 away from the stationary device, rather than lifting the device away from the tracking surface. In addition, referring to relative movement between the device and the tracking surface may comprise movement of the device 21 (e.g., a mouse moving over a mouse pad), movement of the tracking surface 51 (e.g., a moving trackball or human skin, such as a finger, moving in the path of a coherent light beam (see FIG. 1B)), or movement of both the tracking surface and the device.

The optic 33 is mounted in the housing 45 and positioned within the coherent light beam 29 for altering a wavefront profile 75 of the coherent light beam. Wavefront profile 75 is defined as any constant phase profile passing through the coherent light beam 29. An infinite number of such wavefront profiles 75 exist along a coherent light beam, but typically such wavefront profiles are not planar. Thus, when such wavefront profiles 29 strike a flat surface, the light arriving at any single instant is typically out-of-phase. For example, the wavefront profile 29 depicted in FIGS. 1 and 1A is curved, demonstrating that the coherent light leaving the coherent light source 25 does not have a planar wavefront profile. Without an appropriate optic 33, the shortest path length from the coherent light source 25 to the tracking surface 51 is along the normal line between the two, while all other non-normal coherent light will arrive at the tracking surface out-of-phase and at some later time, proportional to radial position. The optic 33 of the present invention corrects this out-of-phase condition, such that at least one wavefront profile 75 is substantially planar. When the tracking surface 51 is positioned to coincide with this wavefront profile 75, the waves of coherent light arrive simultaneously at the tracking surface. The type of optic 33 capable of altering the coherent light beam 29 in this manner is a converging optic, for focusing the coherent light beam appropriately as the coherent light beam strikes the tracking surface 51. The converging optic 33 need not perfectly focus the coherent light beam 29 to a point source, but may include slight aberrations that will not affect the device's 21 ability to perform.

In the embodiment of FIGS. 1 and 1A, the optic 33 is a convex lens, specifically a bi-convex, aspherical lens. Other optics 33, such as those including more than one lens, non-aspherical lenses and piano convex lenses are also contemplated as within the scope of the claimed invention. The optic 33 has a focal length F greater than the tracking distance T, such that the coherent light beam 29 focuses to a focal point P beyond the support surface 61. This ensures that the substantially planar wavefront profile 75 occurs at some distance between the optic 33 and the focal point P. The optic 33 can additionally control the coherent light beam of the laser to have an illumination diameter D, or beam width, of less than about 3.0 millimeters (120 mils (milliinches)) at the tracking distance T. Other similar optics 33 can readily alter the coherent light beam 29 to an illumination diameter D of less than about 2.0 millimeters (79 mils (milliinches)) at the tracking distance T, or less than about 1.0 millimeter (39 mils (milliinches)) at the tracking distance.

Figure 3:
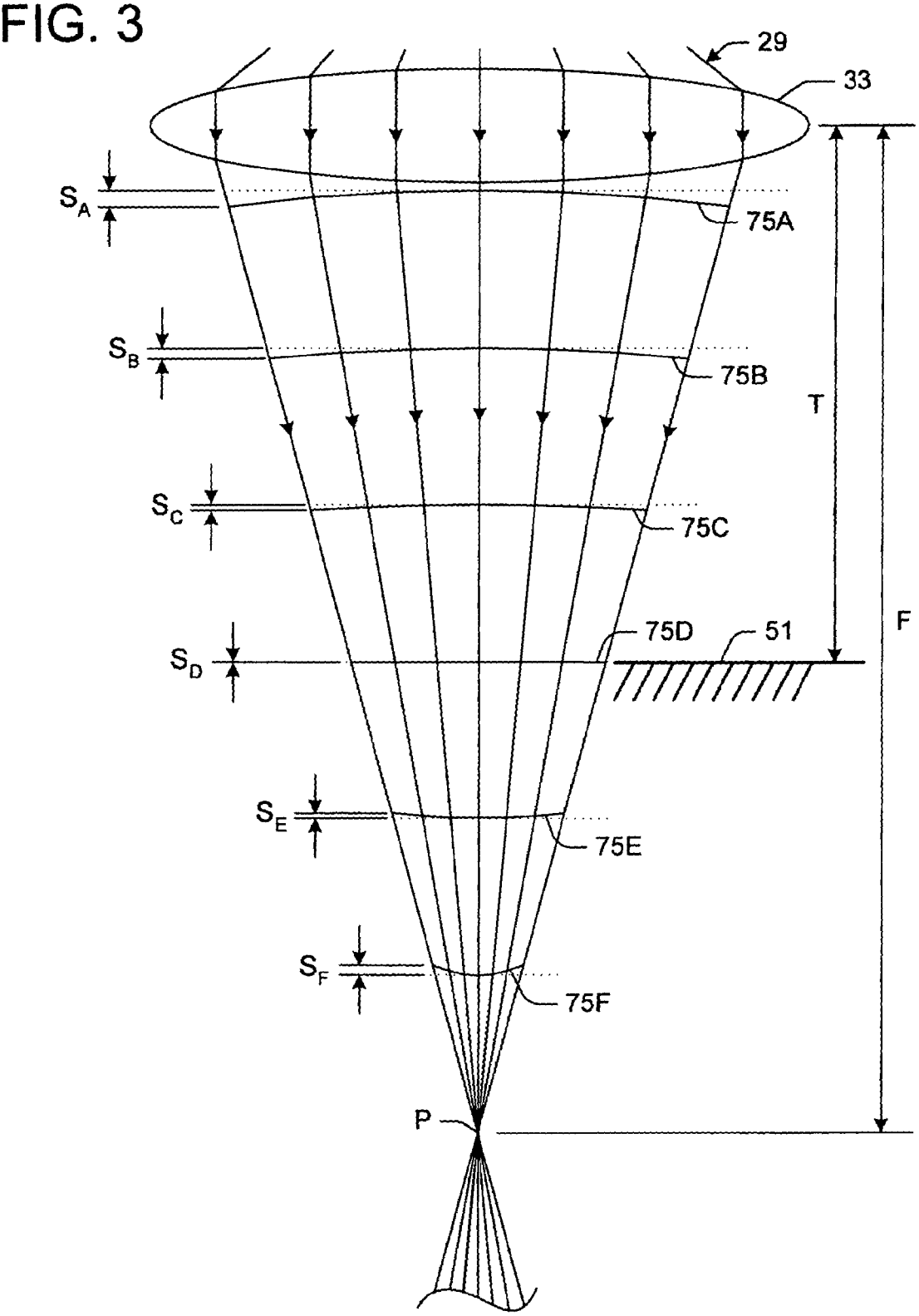
FIG. 3 is a schematic of an optic demonstrating a coherent light wavefront profile having a substantially constant phase.

Altering the wavefront profile 75 is important to the stability of the speckle pattern 53, which affects the ability of the device 21 to both track the tracking surface 51 and detect lift-off of the device. Referring now to FIG. 3, a schematic of an optic 33 with various wavefront profiles 75 demonstrates the substantially constant phase of a coherent light wavefront profile altered according to the present invention. Modeling the VCSEL as a point source, the optic 33 alters the wavefront profile 75 of the coherent light beam 29. Single mode VCSELs in particular satisfy the wavefront profile characteristics needed to create a constant phase profile over the illuminated area. Each wavefront profile 75A-F demonstrates a layer of coherent light in constant phase. Referring first to wavefront profile 75A, the maximum sag, or phase lag of the coherent light as measured from a plane normal to the coherent light beam 29, is shown by dimension $S_A$. Thus, at wavefront profile 75A, the coherent light near the edge of the coherent light beam 29 is out-of-phase with the coherent light at the center of the coherent light beam by as much as $S_A$. Were the tracking surface 51 to be placed in the coherent light beam 29 near wavefront profile 75A, the speckle pattern 53 would tend not to be substantially stable, because the phase of the wavefront is not substantially constant across the illuminated area at this location relative to the optic 33, causing the speckle pattern to boil. Turning to wavefront profile 75B, the maximum sag $S_B$ is significantly reduced so that the coherent light presents a more constant phase profile, yet not nearly constant, over the image plane. The sag $S_C$ at wavefront profile 75C shows a further reduction in wavefront profile sag. As sag decreases, speckle pattern 53 stability increases because the coherent light beam 29 striking the image plane presents a more constant phase over the illuminated area, reducing boiling. Thus, the ability to track relative movement between the tracking surface 51 and the device 21 tends to increase over wavefront profiles 75A, 75B and 75C due to decreasing sag and more in-phase coherent light.

For more stability, wavefront profile 75D demonstrates a wavefront profile presenting a constant phase to the illuminated area which is well-suited for tracking. A constant phase across the illuminated area at 75D yields a substantially zero sag $S_D$ across the illuminated area of the coherent light beam 29 yields a substantially stable speckle pattern 53, particularly suited for tracking. This location is ideal for placement of the tracking surface 51, as depicted in FIG. 3, because it provides the best tracking correlation for use by the device 21. To obtain such a substantially constant phase, the coherent light beam 29 of the VCSEL 25 passes through the converging optic 33 and is oriented normal to the tracking surface 51. At wavefront profile 75D, almost perfect phase compensation is achieved, and the speckle pattern 53 is substantially stable because the optic 33 optimizes the coherent light wavefront profile to be in-phase where the device 21 contacts the tracking surface 51. Although wavefront profile 75D provides the most stable speckle pattern 53, one skilled in the art would understand that speckle patterns 53 suitable for tracking may also be achieved slightly above or below the wavefront profile 75D, as well as with collimating lens systems.

Wavefront profiles 75E and 75F suffer drawbacks similar to wavefront profiles 75A-C. As the tracking surface 51 moves away from planar wavefront profile 75D, such as when the device 21 is lifted from the tracking surface 51 or the tracking surface is lifted from the device, the speckle pattern 53 becomes less stable, and includes a greater proportion of boiling speckle grains. This degradation of the speckle pattern 53 leads to difficultly in tracking relative movement between the device 21 and the tracking surface 51, as will be discussed in detail below. The dimensions and angles of FIG. 3 are for demonstration purposes only and should not be construed as scaleable examples. Coherent light having a wavelength on the scale of hundreds of nanometers, for example, would exhibit a much sharper decline toward an out-of-phase condition than is depicted. As discussed in greater detail below, speckle grain size is also changing substantially as the illuminated area changes (e.g., from the $S_D$ position to the focal point P). The diameter of the coherent light beam 29 changes from a range of about 1.0 to 3.0 millimeters (39 to 120 mils (milliinches)) at $S_D$ to a range of about 10 to 20 microns (0.39 to 0.79 mils (milliinches)) at the focal point P. This difference is a change of two orders of magnitude, which disrupts the ability of a tracking algorithm of the tracking engine 37 to resolve a trackable feature.

Applying these principles to the device 21, as depicted in FIGS. 1 and 1A, the tracking distance T of the device is shorter than the focal length F of the optic 33, which projects beyond the tracking surface 51 when the device contacts the tracking surface (FIG. 1). When the coherent light source 25 and tracking surface 51 are separated by about the tracking distance T, the tracking surface reflects a substantially stable speckle pattern 53 from the altered coherent light beam 29, which produces optimum speckle pattern image stability at a position somewhat less than the distance to the focal point P.

Turning now to FIG. 4, a graph demonstrates the phase error associated with lens placement within a housing, where such placement is subject to certain manufacturing tolerances. For this demonstration, a 25 millimeter (0.98 inch) focal length F lens and a 1.0 millimeter (39 mils (microinches)) diameter coherent light beam from a 850 nanometer (33 mils (microinches)) wavelength VCSEL were utilized. For this particular optic 33, the ideal tracking distance T is about 12.5 millimeters (0.492 inch). Because the optic 33 cannot be placed within the housing with absolute certainty at a tracking distance T of 12.5 millimeters (0.492 inch), this demonstration further assumes that the tolerance for placement of the optic 33 within the housing 45 is about ±0.20 millimeters (±8 mils (milliinches)). Five example cases are plotted, assuming the optic is mounted at a tracking distance of 12.7 millimeters (0.500 inch), 12.6 millimeters (0.496 inch), 12.5 millimeters (0.492 inch), 12.4 millimeters (0.488 inch) and 12.3 millimeters (0.484 inch). Phase error for each example case is plotted as a function of radial position of the coherent light within the 1.0 millimeter (39 mils (microinches)) diameter coherent light beam.

For example, in the example case where the optic is mounted at a tracking distance T of exactly 12.5 millimeters (0.492 inch), the phase error is nearly zero across the entire width of the coherent light beam 29. This case is the ideal scenario described above, where all of the coherent light reaches the tracking distance T in-phase. The 12.6 millimeters (0.496 inch) and 12.4 millimeters (0.488 inch) examples are similar to one another, exhibiting relatively consistent phase light across the beam. Specifically, within ±0.35 millimeter (±14 mils (milliinches)) of the center of the coherent light beam, all of the coherent light is within ±5% of the same phase. For the entire beam width (±0.50 millimeter (±20 mils (milliinches))), all of the coherent light is within ±10% of the same phase. Although not completely in-phase, the coherent light is nearly enough in-phase to provide a substantially stable speckle pattern 53 for tracking. Finally, for optics 33 mounted at the 12.7 millimeters (0.500 inch) and 12.3 millimeters (0.484 inch) examples, which are also similar to one another, the coherent light is more out-of-phase as it reaches the tracking distance T, but is still relatively in-phase across the coherent light beam 29. Specifically, within ±0.35 millimeters (±14 mils (milliinches)) of the center of the coherent light beam, all of the coherent light is within ±10% of the same phase. For the entire beam width (±0.5 millimeter (±20 mils (milliinches))), all of the coherent light is within ±20% of the same phase. Although not completely in-phase, the coherent light is nearly enough in-phase to provide a substantially stable speckle pattern 53 for tracking.

These examples demonstrate several points. First, for a given converging optic 33, only a single, planar wavefront profile 75 exists at a particular tracking distance T from the optic, providing a precisely in-phase wavefront profile across the coherent light beam 29. Second, wavefront profiles 75 located only a small distance from the planar wavefront profile will exhibit some out-of-phase behavior. Third, even with some out-of-phase behavior with an optic mounted at either ±0.20 millimeter (±8 mils (milliinches)) from design, the coherent light exhibits enough nearly in-phase behavior to produce a substantially stable speckle pattern 53. Thus, mounting the optic 33 within the ±0.20 millimeter (±8 mils (milliinches)) tolerance will maintain the optic in a position where substantially stable speckle patterns 53 for tracking will be produced.

Beyond altering the wavefront profile 75 for detecting relative movement between the tracking device 21 and the tracking surface 51, as discussed above, the optic 33 of the device also alters the wavefront profile 75 of the coherent light beam 29 so that the coherent light beam is substantially out-of-phase across the beam within a plane perpendicular to the beam at another distance, an out-of-phase distance, from the optic. Referring back to the example of FIG. 3, wavefront profiles 75A-C, 75E and 75F are examples of such out-of-phase wavefront profiles. When the tracking surface 51 is located at about the out-of-phase distance from the optic 33, a boiling speckle pattern 53 is created. As discussed above, a boiling speckle pattern is one in which the individual speckle grains are not substantially stable with respect to the tracking surface 51. With the device 21 at one location, a particular speckle grain may be visible, while at another adjacent device location, that particular speckle grain may disappear while another speckle grain appears in a different position. Boiling speckle patterns 53 are difficult to track because the speckle grains are constantly disappearing and reappearing as the device 21 and tracking surface move relative to one another, robbing the controller 37 of tracking information based upon stable speckle grains and providing incorrect information based upon newly appearing speckle grains. One such out-of-phase distance that will produce the boiling speckle pattern 53 is a distance about equal to the focal length F of the optic 33. Immediately above and below the focal point P are also likely locations for boiling speckle patterns 53.

Although boiling speckle patterns are a nuisance when attempting to track relative movement between a device 21 and a tracking surface 51, the untrackable nature of boiling speckle patterns provides a promising way in which to determine if lift-off of the device has occurred, which indicates that tracking should cease. As described above, the controller 37 is responsive to the detector 41 for correlating the speckle pattern 53 to track the relative movement between the tracking surface 51 and the device when the detector detects the substantially stable speckle pattern. When the device 21 and the tracking surface 51 move away from each another, the focal point P will approach the tracking surface. As the focal point P approaches the tracking surface 51, the laser speckle pattern 53 will become very unstable. Intense speckle pattern 53 boiling occurs when the focal point P is near the tracking surface 51. This natural instability is inherently untrackable in correlation-based tracking engines 37. The controller, or tracking engine, will lose its ability to track and cease tracking, freezing the cursor in the last location of successful tracking. This result is beneficial because it mimics the natural tendency of a mechanical tracking device, such as a conventional rollerball mouse, to freeze when it is lifted from the tracking surface 51. The point at which the device 21 stops tracking and freezes the cursor may be adjusted by increasing or decreasing the sensitivity of the detector 41, changing the threshold at which the controller 37 determines there is too much boiling to track properly, selecting a different optic 33 or otherwise controlling the shape of the wavefront profile 75 of the coherent light beam 29.

Speckle grain size within the speckle pattern 53 is also a determining factor of when lift-off is detected. The average speckle grain size reflected off of a diffuse surface of a polarized laser is given by $$\sigma = \frac{1.22\lambda L}{D}$$

where $\sigma$ is the average width of a speckle grain on the image plane, $\lambda$ is the wavelength of the coherent light beam, L is the distance from the optic to the image plane and D is the width of the beam, or illumination diameter, at the image plane. The coherent light beam wavelength $\lambda$ and distance L from the optic to the image plane are directly proportional to average speckle grain size $\sigma$. The illumination diameter D is inversely proportional to average speckle grain size $\sigma$. Thus, as the device 21 is lifted from the tracking surface 51 (e.g., compare FIGS. 1 and 2), L increases and D decreases, thereby increasing the average width of each speckle grain $\sigma$.

In addition to creating a boiling speckle pattern 53 as discussed above, locating the tracking surface 51 at about the focal point P of the optic 33 limits the ability of the device 21 to track, by creating speckle grains that are on average too large to track relative to the illumination diameter D of the coherent light beam 29. According to the equation noted above, as the device 21 is lifted and the focal point P approaches the tracking surface 51, the illumination diameter D of the beam approaches zero, while the distance L from the optic to the image plane increases. As this occurs, speckle grain size increases dramatically, making the average speckle grain size too large to track. Speckle grains too large to track typically have an average width of at least about 250 microns (9.8 mils (milliinches)).

For example, consider an 850 nanometer (33 microinch) wavelength VCSEL beam passing through a 25 millimeter (0.98 inch) focal length F lens, wherein the substantially planar wavefront profile 75 occurs at 12.5 millimeters (0.492 inch) from the optic 33 and the beam has a 1.0 millimeter (39 mils (milliinches)) illumination diameter D at the planar wavefront profile and a 10 micron (0.39 mils (milliinches)) illumination diameter at the focal point P. At the location of the planar wavefront profile, or tracking distance T, average speckle grain size is about 13 microns (0.51 mils (milliinches)). This average speckle grain size is ideally suited for an illumination diameter of 1000 microns (39 mils (milliinches)), yielding enough speckle grains to provide useful tracking information. When the device 21 is lifted 5.0 millimeters (0.20 inch) from the tracking surface 51, such that the distance L from the optic 33 to the image plane is 17.5 millimeters (0.69 inch), average speckle grain size is about 30 microns (1.2 mils (milliinches)). This average speckle grain size is also ideally suited for an illumination diameter of 600 microns (24 mils (milliinches)), yielding enough speckle grains to provide useful tracking information. When the device 21 is lifted further, to 10 millimeters (0.39 inch) from the tracking surface 51, such that the distance L from the optic 33 to the image plane is 22.5 millimeters (0.89 inch), average speckle grain size increases significantly to about 110 microns (4.3 mils (milliinches)). This average speckle grain size is less ideally suited for an illumination diameter of 210 microns (8.3 mils (milliinches)), because less than five speckle grains are likely included in the illumination diameter, limiting the ability of the device 21 to track movement. Finally, when the device 21 is lifted to 12.5 millimeters (0.492 inch) from the tracking surface T, such that the focal point P and tracking surface 51 coincide, average speckle grain size increases dramatically to about 2600 microns (100 mils (milliinches)), while the illumination diameter shrinks to 10 microns (0.39 mils (milliinches)). Thus, because average speckle grain size is two orders of magnitude larger than the illumination diameter D size, tracking is not possible and a lift-off condition is detected.

As demonstrated by the foregoing examples, the controller 37 is also responsive to the detector 41 for suspending tracking of the relative movement between the tracking surface 51 and the device 21 when the detector detects the boiling speckle pattern 53 or average speckle grain size overwhelms the detector 41. Because both boiling speckle and grain size increase as the tracking surface 51 and device 41 moves further and further away from one another, the controller 37 becomes more likely to determine that the speckle pattern 53 is not substantially stable and that tracking should be suspended. Once tracking is suspended due to the boiling speckle pattern 53 or when speckle grains become too large, the controller 37 indicates a lift-off condition by stopping signaling that the tracking surface 51 and device 41 are moving relative to one another. This indicates to a user that the device 21 is no longer tracking relative to the tracking surface.

The combination of tracking detection and lift-off detection provide an opportunity to control tracking and off-surface detection to specific zones, such that tracking will occur in one zone while lift-off indication occurs in another. For example, the optic 33 may be selected and positioned in the coherent light beam 29 for altering the wavefront profile 75 of the coherent light beam to create a detection zone between about 35% and about 90% of the focal length F of the optic. Relative movement within the detection zone between the coherent light beam 29 and the tracking surface 51 is detected based on the reflected speckle pattern 53. In such a scenario, the support surface 51 and housing 45 are dimensioned to have a tracking distance T at about 35% of the focal length F of the optic.

Similarly, the optic 33 is selected and positioned in the coherent light beam 29 for altering the wavefront profile 75 of the coherent light beam to create a lift-off zone beyond about 90% of the focal length F of the optic. Relative movement within the lift-off zone between the coherent light beam 29 and the tracking surface 51 is not detected. The inability to detect such relative movement is due to one or both of boiling of the reflected speckle pattern 53 and increased speckle grain size. When the tracking surface 51 is at about 90% of the focal length F, speckle pattern 53 boiling is likely the dominant characteristic enabling the device 21 to detect lift-off. When the tracking surface is at about 100% of the focal length F, increased speckle grain size is likely the dominant characteristic enabling the device to detect lift-off, as speckle grain size increases to greater than 250 microns (9.8 mils (milliinches)) or much larger than the illumination diameter D.

Another device 21 includes a detection zone between about 50% and about 80% of the focal length F. Relative movement within the detection zone between the coherent light beam 29 and the tracking surface 51 is detected based on the reflected speckle pattern 53. Yet another device includes a detection zone between about 50% and about 75% of the focal length F for detecting relative movement between the coherent light beam 29 and the tracking surface 51 based on the reflected speckle pattern 53.

In another embodiment, the device 21 is dimensioned such that the tracking distance T is between about 35% and about 90% of the focal length F. In still another embodiment, the device 21 is dimensioned such that the tracking distance T is between about 50% and about 80% of the focal length F. Another device 21 is sized and shaped such that the tracking distance T is between about 50% and about 75% of the focal length F. Still another device 21 is dimensioned such that the tracking distance T is between about 60% and about 75% of the focal length F. Yet another device 21 is sized and shaped such that the tracking distance T is between about 70% and about 75% of the focal length F. Another device is dimensioned such that the tracking surface T is about 75% of the focal length F.

Another device 21 comprises an optic 33 having a focal length F between about 8 millimeters (0.31 inch) and about 30 millimeters (1.18 inches). The device 21 further includes a tracking distance T between about 4 millimeters (0.16 inch) and about 15 millimeters (0.59 inch).

Still another device 21 comprises an optic 33 having a focal length F between about 18 millimeters (0.79 inch) and about 25 millimeters (0.98 inch). The device 21 further includes a tracking distance T between about 9 millimeters (0.35 inch) and about 15 millimeters (0.59 inch). Another device 21 comprises an optic 33 with a focal length F of about 25 millimeters (0.98 inch) and a tracking distance T of about 12.5 millimeters (0.492 inch). Still another device 21 includes an optic 33 with a focal length F of about 20 millimeters (0.79 inch) and a tracking distance T of about 15 millimeters (0.59 inch). Yet another device includes an optic 33 with a focal length F of about 18 millimeters (0.71 inch) and a tracking distance T of about 13.5 millimeters (0.531 inch).

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A data input device for use with a tracking surface, said tracking surface being optically rough, said device comprising:
   a coherent light source for projecting a coherent light beam onto said tracking surface to reflect a speckle pattern from the coherent light beam striking said tracking surface;
   an optic positioned in the coherent light beam for altering a wavefront profile of the coherent light beam so that the coherent light beam has a substantially constant phase relative to a plane perpendicular to said beam at a tracking distance from said optic, said tracking distance being different than a focal length of the optic, whereby said tracking surface reflects a substantially stable speckle pattern from the altered coherent light beam when the coherent light source and tracking surface are separated by about said tracking distance, wherein said optic alters the wavefront profile of said coherent light beam so that the coherent light beam is substantially out-of-phase across the coherent light beam within a plane perpendicular to said beam at an out-of-phase distance from said optic, such that locating the tracking surface at about said out-of-phase distance from said optic creates a boiling speckle pattern;
   a detector associated with the coherent light source for detecting said speckle pattern reflected by the tracking surface and for imaging the detected speckle pattern; and
   a controller responsive to the detector for correlating the speckle pattern either to track relative movement between the coherent light beam and the tracking surface when the detector detects said substantially stable speckle pattern or to suspend tracking of relative movement between the coherent light beam and the tracking surface when the detector detects said boiling speckle pattern.

2. A device as set forth in claim 1 wherein said optic has a focal length greater than said tracking distance.

3. A device as set forth in claim 2 wherein said tracking distance is about the distance from the tracking surface to the optic when the device is at least one of contacting the tracking surface and nearly contacting the tracking surface.

4. A device as set forth in claim 3 wherein said tracking distance is between about 35% and about 90% of said focal length.

5. A device as set forth in claim 4 wherein said tracking distance is between about 50% and about 80% of said focal length.

6. A device as set forth in claim 5 wherein said tracking distance is between about 50% and about 75% of said focal length.

7. A device as set forth in claim 6 wherein said tracking distance is between about 60% and about 75% of said focal length.

8. A device as set forth in claim 7 wherein said tracking distance is between about 70% and about 75% of said focal length.

9. A device as set forth in claim 8 wherein said tracking distance is about 75of said focal length.

10. A device as set forth in claim 3 wherein said focal length is between about 8 millimeters (0.31 inch) and about 30 millimeters (1.18 inches).

11. A device as set forth in claim 10 wherein said tracking distance is between about 4 millimeters (0.16 inch) and about 15 millimeters (0.59 inch).

12. A device as set forth in claim 10 wherein said focal length is between about 18 millimeters (0.79 inch) and about 25 millimeters (0.98 inch).

13. A device as set forth in claim 12 wherein said tracking distance is between about 9 millimeters (0.35 inch) and about 15 millimeters (0.59 inch).

14. A device as set forth in claim 13 wherein said focal length is about 25 millimeters (0.98 inch) and said tracking distance is about 12.5 millimeters (0.492 inch).

15. A device as set forth in claim 13 wherein said focal length is about 20 millimeters (0.79 inch) and said tracking distance is about 15 millimeters (0.59 inch).

16. A device as set forth in claim 13 wherein said focal length is about 18 millimeters (0.71 inch) and said tracking distance is about 13.5 millimeters (0.531 inch).

17. A device as set forth in claim 1 wherein said optic is a converging optic for focusing the coherent light beam as the coherent light beam strikes the tracking surface.

18. A device as set forth in claim 1 wherein said out-of-phase distance is about equal to the focal length of the optic.

19. A device as set forth in claim 1 wherein said controller indicates a lift-off condition when suspending tracking due to said boiling speckle pattern.

20. A device as set forth in claim 1 further comprising a housing, said coherent light source and said optic mounted on said housing.

21. A device as set forth in claim 20 wherein said housing is adapted to contact said tracking surface.

22. A device as set forth in claim 21 wherein said housing includes a support surface sized and shaped for contacting said tracking surface.

23. A device as set forth in claim 22 wherein said support surface is substantially continuous.

24. A device as set forth in claim 23 wherein said support surface is substantially planar.

25. A device as set forth in claim 24 wherein said optic includes at least one lens.

26. A device as set forth in claim 25 wherein said at least one lens is convex.

27. A device as set forth in claim 26 wherein said at least one lens is aspherical.

28. A device as set forth in claim 26 wherein said at least one lens is at least one of bi-convex and plano convex.

29. A device as set forth in claim 1 wherein the coherent light source draws less than about 1.0 mW (1.3 μhorsepower).

30. A device as set forth in claim 1 wherein said coherent light source is a laser.

31. A device as set forth in claim 30 wherein said laser is a vertical cavity surface emitting laser (VCSEL).

32. A device as set forth in claim 1 wherein said coherent light beam has an illumination diameter of less than about 3.0 millimeters (120 mils (milliinches) at said tracking distance from said optic.

33. A device as set forth in claim 32 wherein said coherent light beam has an illumination diameter of less than about 2.0 millimeters (79 mils (milliinches)) at said tracking distance from said optic.

34. A device as set forth in claim 33 wherein said coherent light beam has an illumination diameter of less than about 1.0 millimeter (39 mils (milliinches)) at said tracking distance from said optic.

35. A device as set forth in claim 1 wherein said tracking surface is human skin for reflecting a speckle pattern from the coherent light beam striking the human skin.

36. A data input device for use with a tracking surface, said tracking surface being optically rough, said device comprising:
  a coherent light source for projecting a coherent light beam onto said tracking surface to reflect a speckle pattern from the coherent light beam striking said tracking surface; and
  an optic positioned in the coherent light beam for altering a wavefront profile of the coherent light beam so that the coherent light beam has a substantially constant phase relative to a plane perpendicular to said beam at a tracking distance from said optic, said tracking distance being different than a focal length of the optic, whereby said tracking surface reflects a substantially stable speckle pattern of speckle grains from the altered coherent light beam when the coherent light source and tracking surface are separated by about said tracking distance, wherein said optic alters the wavefront profile of said coherent light beam so that the coherent light beam is substantially out-of-phase across the coherent light beam within a plane perpendicular to said beam at an out-of-phase distance from said optic about equal to the focal length of the optic, such that locating the tracking surface at about said focal point of said optic creates speckle grains that are on average too large to track relative to an illumination area of the coherent laser beam and such that locating the tracking surface at about said out-of-phase distance from said optic at about said focal length of the optic creates a boiling speckle pattern.

37. A device as set forth in claim 36 further comprising a detector associated with the coherent light source for detecting said speckle pattern reflected by the tracking surface and for imaging the detected speckle pattern.

38. A device as set forth in claim 37 further comprising a controller responsive to the detector for correlating the speckle pattern to track relative movement between the coherent light beam and the tracking surface when the speckle pattern is substantially stable.

39. A device as set forth in claim 36 wherein said speckle grains too large to track have an average width of at least about 250 microns (9.8 mils (milliinches)).

40. A data input device for use with a tracking surface, said tracking surface being optically rough, said device comprising:

a coherent light source for projecting a coherent light beam onto said tracking surface to reflect a speckle pattern from said coherent light beam striking said tracking surface; and an optic positioned in the coherent light beam for altering a wavefront profile of said coherent light beam to create a detection zone between about 35% and about 90% of the focal length of the optic, wherein relative movement within the detection zone between said coherent light beam and said tracking surface is detected based on the reflected speckle pattern, and a lift-off zone beyond about 90% of the focal length of the optic, wherein relative movement within the lift-off zone between said coherent light beam and said tracking surface is not detected, wherein the speckle pattern comprises speckle grains, such that locating the tracking surface at about said focal length of said optic creates speckle grains that are on average too large to track relative to an illumination area of the coherent laser beam.

41. A device as set forth in claim 40 wherein said tracking surface is not detected due to boiling of the reflected speckle pattern.

42. A device as set forth in claim 40 wherein said tracking surface is not detected due to increased speckle grain size.

43. A device as set forth in claim 40 wherein said detection zone is between about 50% and about 80% of said focal length.

44. A device as set forth in claim 43 wherein said detection zone is between about 50% and about 75% of said focal length.

45. A device as set forth in claim 40 wherein said optic is a converging optic for focusing the coherent light beam as the coherent light beam strikes the tracking surface.

46. A device as set forth in claim 40 wherein said speckle grains too large to track have an average width of at least about 250 microns (9.8 mils(milliinches)).

47. A device as set forth in claim 40 further comprising a housing, said coherent light source and said optic mounted on said housing.

48. A device as set forth in claim 40 wherein said coherent light source is a laser.

49. A data input device for suspending tracking of movement comprising:

a source projecting a coherent light beam onto an optically rough tracking surface, an optic focusing the coherent light beam, said optic altering the wavefront profile of said coherent light beam such that the coherent light beam has a substantially constant phase across at least one plane perpendicular to the coherent light beam, a detector detecting out-of-phase coherent light reflected from the tracking surface as a speckle pattern, and a controller determining if said data input device is spatially separated from said tracking surface by at least a lift-off detection distance as a function of whether the average width of the speckle grains of the speckle pattern are too large to track, said controller suspending tracking of relative movement between said data input device and said tracking surface when said data input device is spatially separated from said tracking surface by at least the lift-off detection distance.

50. A device as set forth in claim 49 wherein said controller maintains tracking of relative movement between said data input device and said tracking surface when said data input device is spatially separated from said tracking surface by less than said lift-off detection distance.

51. A device as set forth in claim 49 wherein said function of the detected speckle pattern is whether the speckle pattern is boiling.

* * * * *